W. H. COLLIER.
STARTER AND LIGHT CONTROL FOR MOTORS.
APPLICATION FILED JUNE 9, 1913.
1,172,583.
Patented Feb. 22, 1916.
3 SHEETS—SHEET 3.
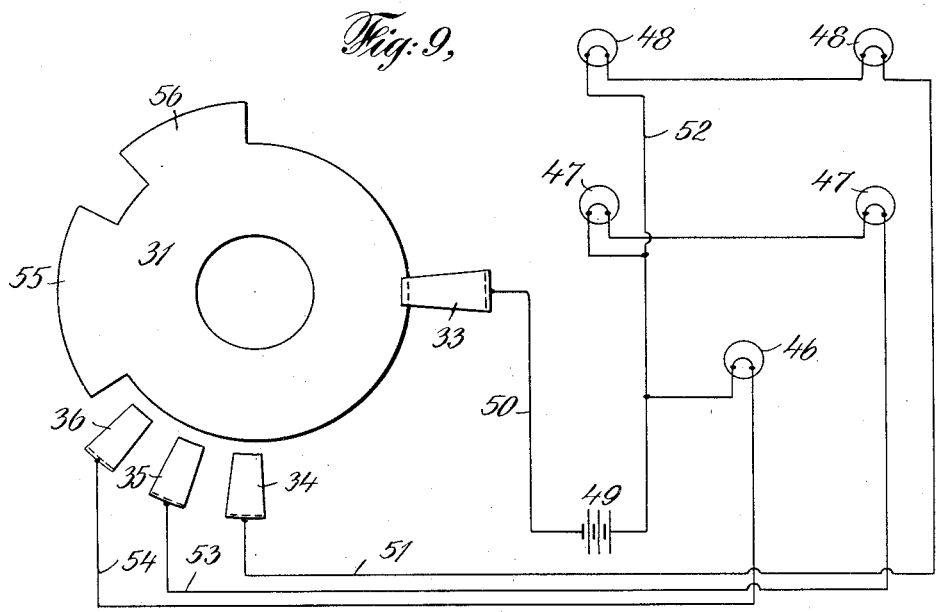
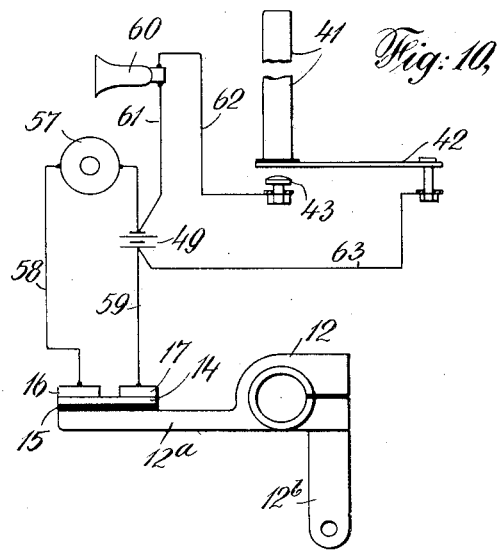
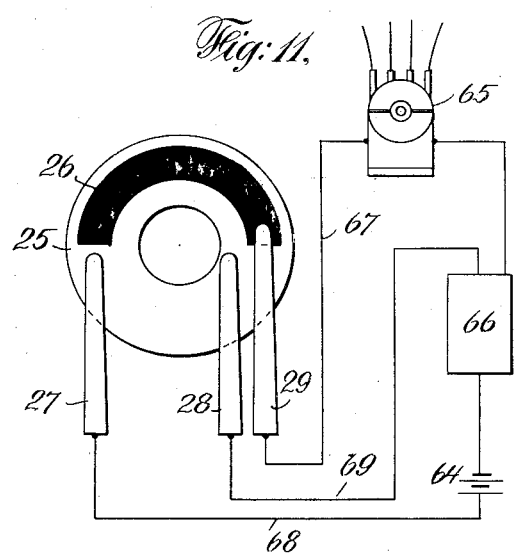
Witnesses:
Max B. A. Doring
Paul H. Franke
Inventor
William H. Collier
By his Attorneys
Marble + Matty

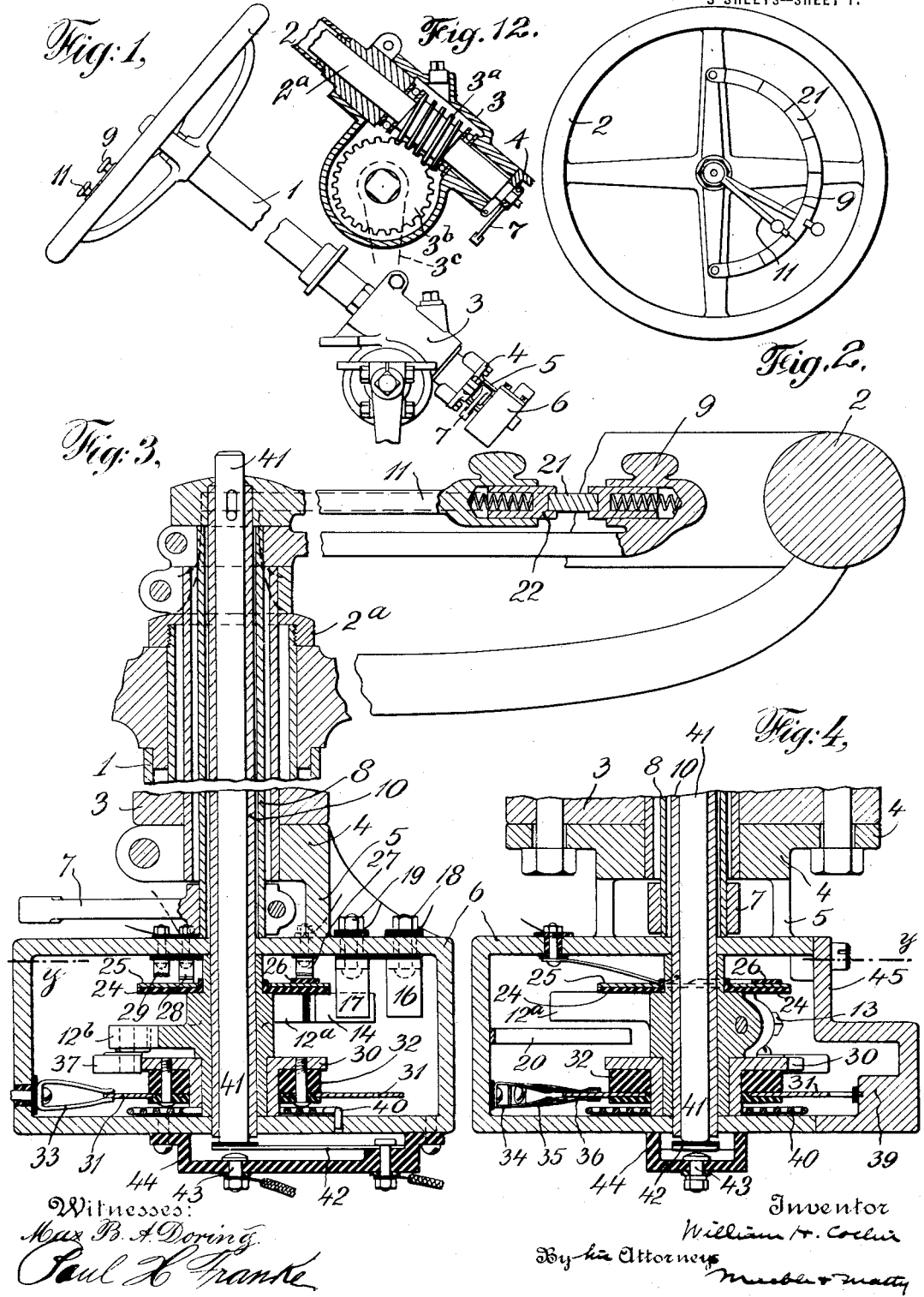

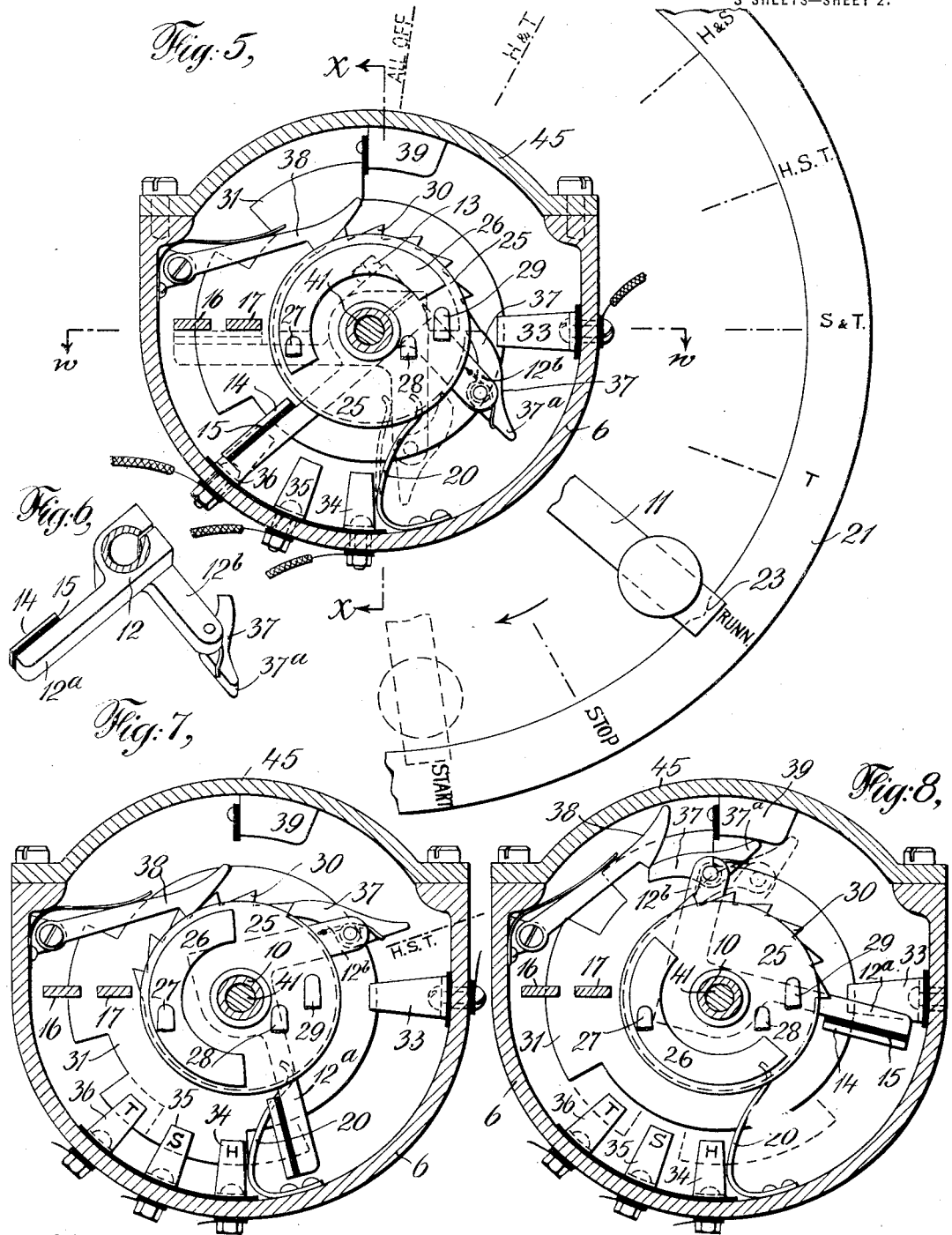

UNITED STATES PATENT OFFICE.

WILLIAM H. COLLIER, OF NASHVILLE, TENNESSEE.

STARTER AND LIGHT CONTROL FOR MOTORS.

1,172,583.      Specification of Letters Patent.      Patented Feb. 22, 1916.

Application filed June 9, 1913. Serial No. 772,649.

*To all whom it may concern:*

Be it known that I, WILLIAM H. COLLIER, a citizen of the United States of America, and a resident of Nashville, in the county of Davidson and State of Tennessee, have invented a certain new and useful Starter and Light Control for Motors, of which the following is a specification.

My invention relates to mechanism for controlling the electric starters now commonly employed in connection with the internal combustion engines of motor vehicles, and for controlling the lights of such vehicles.

While my invention is particularly intended for use on motor propelled road vehicles, it is equally applicable to motor cars, motor boats, and motor propelled aeroplanes and dirigible balloons, and therefore I use the term motor vehicle in a broad sense, to include, not only motor propelled road vehicles, but also railway vehicles, boats, aeroplanes and dirigible balloons.

My invention comprises starter control means arranged in connection with the steering mechanism of the vehicle and operable by means mounted on the steering post of the vehicle; and my invention further comprises means for the control of the lights of the vehicle, operable by the same means which controls the starter, also an improved and simplified switching mechanism for the control of an electric starter and for the control of the lighting and other circuits.

The objects of my invention are, to facilitate the operation of the motor vehicles, and, particularly, to facilitate the operation of the starters of such vehicles and the control of the lighting and other circuits of such vehicles; to permit the complete control of the starter and the circuits referred to by means located on the steering post of the vehicle, and, particularly, by means located in connection with the steering wheel of the vehicle; to permit the complete control of both the starter and the lighting and other circuits by one operating means; and to improve and simplify switching mechanism for the control of the electric starters and for the control of lighting and other circuits of a vehicle.

I will now proceed to describe my invention with reference to the accompanying drawings and will then point out the novel features in claims. In said drawings:—Figure 1 shows a side elevation of a typical steering post and associated parts of an automobile or motor propelled road vehicle having my improved control means applied thereto. Fig. 2 is a top view of the steering wheel and associated parts, showing the hand lever for the operation of my improved control mechanism, and showing also the ordinary throttle control. Fig. 3 shows an axial section through the steering post and contro' mechanism, the section being taken on the line $w$—$w$ of Fig. 5. Fig. 4 shows an axial section through the control mechanism and lower portion of the steering post, the section being taken at right angles to that of Fig. 3, *i. e.*, on the line $x$—$x$ of Fig. 5. Fig. 5 shows a transverse section of the control mechanism, the section being taken on the line $y$—$y$ of Figs. 3 and 4; and in connection with this Fig. 5 is also shown a portion of the operating lever of the control mechanism, and a portion of the sector along which such operating lever moves. Fig. 6 is a detail perspective elevation and partial section of one of the parts of the control mechanism. Fig. 7 is a section similar to Fig. 5, showing the parts of the control switch in an intermediate position. Fig. 8 is a further section on the same line $y$—$y$ showing the parts of the switch in the tripping or final position. Fig. 9 is a diagram showing the lighting circuits. Fig. 10 is a diagram showing the starter and horn circuits. Fig. 11 is a diagram showing the ignition circuits. Fig. 12 is a detail longitudinal section of the steering gear.

In the drawings 1 designates the ordinary steering post, 2 the ordinary steering wheel, $2^a$ the hollow steering shaft, within post 1, to which steering wheel 2 is connected, and 3 the casing of the gear mechanism of the steering gear. As the particular construction of these parts forms no portion of my invention, I do not illustrate the same in detail.

To the lower end of the steering gear is connected, by means of a flange 4 of a bracket 5, the controller casing 6; said bracket and flange constituting, in the construction shown, an integral part of the casing; there being a gap between the flange 4 and the main portion of the controller casing 6 for the projection of the ordinary throttle-lever 7, secured to the usual hollow shaft 8 located within the steering post and connected at its upper end to the usual throttle control lever 9. The steering gear is shown in detail in Fig. 12, comprising, as usual, a worm $3^a$ on the steering shaft $2^a$ and a worm wheel $3^b$ intermeshing with that worm and to which is connected the steering arm $3^c$. However, in illustrating a particular steering gear I do not limit myself to use of my invention in connection with that particular steering gear; for the invention herein claimed is independent of the structure of the steering gear itself. Within this throttle control shaft 8 and also within the steering post, there is another hollow shaft 10, forming a portion of the starter and light control mechanism of my invention; and this hollow shaft 10 is connected at its upper end to the control lever 11 (Figs. 1 and 2) while the lower end of this shaft 10 extends through the controller casing 6, and within said casing, has secured to it a bell crank lever 12, shown in detail in Fig. 6, the hub of this bell crank lever being split, as indicated particularly in Fig. 6, and as also shown in Fig. 5, so that that bell crank lever may be clamped to shaft 10 by means of the screw 13, (Figs. 4 and 5). One arm, $12^a$, of this bell crank lever is provided with a contact piece 14, insulated from the arm $12^a$ by means of insulation 15; and this contact plate 14 is adapted to make contact simultaneously with two spring contact pieces 16 and 17 which, as shown hereafter, are in the starter circuit, being electrically connected to binding posts 18 and 19 respectively. In connection with the bell crank lever 12 there is a spring 20 and, when the arm $12^a$ of the bell crank is in contact with contact pieces 16 and 17 (as indicated in dotted lines in Fig. 5) this spring 20 is in engagement with the arm $12^b$ of the bell crank and is tending to press said bell crank backward. The bell crank is moved to the position shown in dotted lines in Fig. 5, by moving the control lever 11, (Figs. 2 and 5) in the direction of the arrow shown in Fig. 5, to the position marked "Start" on the sector 21. As will be shown hereafter, engagement of the contact piece 14 of the bell crank arm $12^a$ with these contact springs 16 and 17, closes the starter circuit; and as I prefer to provide no means for holding the lever 11 in the "start" position shown in Fig. 5, the operator is required to hold that lever in such position, against the pressure of spring 20, during the operation of the starter as a starter; and as soon as the operator releases the control lever 11, the spring 20 forces the lever 11 backward to the running position, marked "Run" in Fig. 5, in which position a locking dog 22 carried by the control lever 11 engages a notch 23 of the sector, which notch is indicated in dotted lines in Fig. 5, so holding that lever in the running position. Between the starting and running positions of lever 11 there is an intermediate position marked "Stop" on the sector 21; and the bell crank arm $12^b$ does not engage the spring 20 until after the lever 11 has passed this "stop" position in its motion toward the "start" position. The spring 20 is of such strength, however, that when the lever 11 is released, when in the "start" position, said spring 20 throws the lever 11 back to the running position, and might throw such lever farther except for the engagement of the dog 22 with the notch 23. Upon the bell crank lever 12 is also mounted a disk 24 of insulating material carrying a conductive disk 25 and on this disk 25 is an insulating segment 26. Spring brushes 27, 28 and 29 (see particularly Fig. 11) are suitably supported by and insulated from the controller casing 6, and are adapted to coact with this contact disk 25 and insulating segment 26. These brushes and the disk 25 and insulation segment 26 control the ignition circuits. Upon the hub of the bell crank lever 12 is also mounted a ratchet wheel 30 upon which wheel is mounted a contact disk 31, insulated from ratchet wheel 30 by insulation 32.

Ratchet wheel 30 is free to rotate with respect to bell crank 12, being actuated as hereinafter described. A plurality of spring contact brushes 33, 34, 35 and 36 are adapted to coact with contact disk 31; and these brushes, as appears clearly from Fig. 9, form contacts of various lighting circuits. For operating the contact disk 31, the arm $12^b$ of bell crank 12 is provided with a spring actuated pawl 37 adapted to engage the first tooth of ratchet wheel 30. Another spring actuated locking pawl 38 (Figs. 5, 7 and 8) is also provided, which pawl is adapted to hold the contact disk 31 in any of the various lighting positions in which it may be left. As will be shown hereafter, when the control lever 11 is moved to the position marked "T" on the sector 21, one lighting circuit is completed through disk 31; the pawl 37 engaging ratchet wheel 30 and moving it anticlockwise (as viewed in Figs. 5, 7 and 8) through the space of one tooth, when the control lever 11 is moved from the running position to said position marked "T"; and the pawl 38, engaging ratchet wheel 30, will hold that disk 31, in the position corresponding to the "T" position on the sector, even though the control lever be thereafter moved in the direction of the arrow shown in Fig. 5, toward the running position, or toward the "stop" position, or the "start" position; and the return of the control lever 11 from the "stop" position or the "start" position to the running position will not affect the position of the contact disk 31 while in a position corresponding to the "T" position or, for that matter, while in positions corresponding to the other positions marked "S & T," "H S T," "H & S" and "H & T" on the sector 21.

The disk 31, being in position corresponding to the position marked "T," may be moved to a position corresponding to any of the other points marked "S & T," "H S T," etc., on the sector, by movement of the lever 11 to a position on the sector corresponding to one of these markings on that sector; and the disk 31 will remain in such position to which it may be adjusted by the lever 11, being held there by engagement of the locking pawl 38 with a proper tooth of the ratchet wheel 30. In each of these various positions of the disk 31 a particular circuit or circuits is or are completed.

To return the disk 31 to the normal position, that is to say, the position in which all of the circuits shown in Fig. 9 are broken, the control lever 11 is moved counter-clockwise (as viewed in Fig. 5) to a position marked "All off" on the sector; this movement of the control lever 11 moving the bell crank 12 to a position, shown in Fig. 8, such that the end 37ª of the pawl 37 is engaged by a stationary trip 39 and is swung back; and the pawl 37, when so swung back, engages the end of the locking pawl 38, and raises that pawl, as also indicated in Fig. 8, so releasing the ratchet wheel 30 and disk 31. A coil spring 40, shown particularly in Figs. 3 and 4, and against the tension of which the ratchet wheel 30 and contact disk 31 have been moved by bell crank lever 12, returns the ratchet wheel 30 and contact disk 31 to starting position, in which position all the circuits shown in Fig. 9 are open.

As will be shown with reference to Figs. 9, 10 and 11, showing the circuits, the control mechanism thus described permits the lamps to be lighted in any combination, and also permits the driving motor of the vehicle to be started and stopped without interference with the light circuits.

Within the hollow shaft 10, by which the controlling mechanism for the starter, ignition, and light circuits is operated, as just described, there is a rod 41 which projects, at its upper end, beyond the hub of the steering wheel 2, and beyond the lever 11; the so projecting end constituting in effect a push button; and the lower end of this rod rests against but is insulated from a contact spring 42 (Figs. 3 and 4) adapted to be moved, by means of the rod 41, into contact with a contact button 43 mounted upon a supplementary casing 44 secured to the controller casing 6. As will be shown hereafter, the spring 42 and button 43 form terminals of the circuit for operating a horn or other electric signaling device.

The casing 6 of the controller mechanism is provided with a removable section 45 (Figs. 4, 5, 7 and 8) by the removal of which access may be gained to the controller mechanism; and the opening in casing 6, made by the removal of this section 45, is sufficient to permit the assembling or dismounting of the controller mechanism.

Referring now to the diagrams of circuits, Figs. 9, 10 and 11, and at first to Fig. 9. In this figure I have shown typical lights for a motor vehicle, comprising a tail light 46, side lights 47 and head lights 48. 49 designates a battery for supplying current to these lights, which battery may be, conveniently, the storage battery of the starting and ignition system, hereinafter described. A conductor 50 leads from one pole of battery 49 to contact brush 33, this brush 33 being the common battery brush of the ignition system. A conductor 51 leads from brush 34 to the head lights 48 and thence is connected to a common return conductor 52. A conductor 53 leads from brush 35 to the side lights 47 and thence is connected to the common return conductor 52. A conductor 54 leads from brush 36 to the tail light 46 and thence is connected to the common return conductor 52. Contact disk 31 is provided with two projections 55 and 56 adapted to make contact with brushes 34, 35 and 36. When control lever 11 is moved to the position marked "T" on sector 21 (Fig. 5) projection 55 of contact disk 31 is in contact with brush 36, and therefore the tail light 46 only is illuminated. When the control lever 11 is in the position marked "S & T" on the sector, projection 55 of contact disk 31 is in contact with brushes 35 and 36, and therefore both tail light 46 and side lights 47 are illuminated. When control lever 11 is in the position marked "H S T" on sector 21, projection 55 of disk 31 is in contact with all three brushes 34, 35 and 36, and therefore the head lights 48, as well as the side lights 47, and tail light 46, are illuminated. The projection 55 is of such length angularly, that when control lever 11 is moved on to the position marked "H & S" on sector 21, said projection 55 is in contact with brushes 34 and 35 only, and therefore only the side lights 47 and head lights 48 are illuminated. When the control lever 11 is in the position marked "H & T" on the sector, the projection 55 of disk 31 is in contact with brush 34 only, head lights 48 being then illuminated. But inasmuch as it is improbable that illumination of the head lights will be desired except when illumination of the tail light is also desired, I have provided disk 31 with a second projection, 56, which projection is in contact with brush 36 when projection 55 is in contact with brush 34 only; the tail light 46 being then illuminated. It will be obvious that other lights might be added and other contact brushes and contact projections, from disk 31, so that in practice any desired number of lights may be illuminated in any desired combination, by means of proper arrangement of brushes and projections on the disk 31.

Referring now to Fig. 10. 57 designates the electric starting motor and 49 designates, as in Fig. 9, the storage battery of the starting, lighting, and ignition system. It will be seen that when contact plate 14 on the arm 12$^a$ of bell crank 12 makes contact with contact springs 16 and 17, a circuit is complete from battery 49 through conductors 58 and 59, and the starter motor 57. As previously explained, the bell crank 12 is in this position only when the control lever 11 is in the position marked "Start" on the sector 21. In Fig. 10 I have also shown the circuit for operating a horn or other signaling device, which horn or signaling device is designated by number 60 in said figure, the circuit comprising a conductor 61 leading from one pole of battery 49 to the said signaling device 60; another conductor 62 leading from said signaling device to the contact button 43 (Fig. 3), and a further conductor 63 leading from the contact spring 42 (Fig. 3) back to the other pole of battery 49.

The starting motor 57 is preferably of a type such that after the engine of the motor vehicle is started, said starting motor 57 becomes a generator which will recharge the storage battery 49 and also will supply current to the lighting circuits shown in Fig. 10 and to the circuit of signaling device 60.

Referring now to Fig. 11 showing the ignition circuits. 64 designates the usual primary battery for supplying current to the ignition circuits until the motor is started, and 65 designates the customary ignition generator and timer, which supplies current to the ignition circuits after the motor has been started. 66 designates diagrammatically the usual ignition coil. 25 designates, as in Figs. 3 and 4, a disk of conductive material arranged to be rotated when the bell crank 12 is rotated by control lever 11; and 26 designates the segment of insulating material carried by this conductive disk 25. When control lever 11 is in the starting position, contact spring 29 (connected to the ignition generator 65 by a conductor 67) is on the insulation segment 26, and therefore the ignition generator is out of the circuit; circuit being then completed from the battery 64 through conductor 68 and contact spring 27 to disk 25 and thence to contact spring 28 and through conductor 69 to the coil 66 and thence back to battery.

The circuit 68, 27, 25, 28, 69 is, as will be readily understood by those skilled in the art, the usual primary circuit of the ignition coil 66. When the control lever is in the running position, contact disk 25 will have been rotated so that brush 27 is now upon insulation segment 26, and brush 29 is in contact with disk 25, and therefore the ignition circuit is complete through brushes 28 and 29 and the ignition generator 65.

I have not illustrated the means by which the current of the secondary of coil 66 is distributed to the various ignition plugs of the motor, when the circuit is complete through the primary battery 64 as previously described, as such means (forming a part of the combined timer and ignition generator 65) is well known by those skilled in the art; nor have I indicated the vibrator with which the primary of coil 66 is customarily provided, the use of such vibrator being well known to those skilled in the art. The circuits shown in Fig. 11 are those circuits with which the assembler or user of a motor vehicle will have to do.

The internal circuits of the coil 66 and the circuits and mechanism of the ignition generator and timer 65 are not shown, being, as above stated, well known to those skilled in the art.

The ignition generator and timer 65 is preferably one which varies the time of ignition automatically in accordance with variation of speed of the engine, (such automatic timers being well known in the art) and therefore I have not in the accompanying drawing shown hand operated means for varying the time of ignition.

What I claim is:—

1. A combined starter and ignition system for motor vehicles, comprising a starter control switch and an ignition control switch and a common operating device for said switches, said operating device having a "running" position in which only the ignition switch is closed, and a "starting" position in which both the ignition and starting switches are closed, and an intermediate "stop" position in which neither switch is closed, and means for moving said operating device automatically from the "starting" position past said "stop" position to said "running" position, said means arranged to permit said operating device to remain at the "stop" position when moved thereto from the "running" position.

2. A combined starter and ignition system for motor vehicles, comprising a starter control switch and an ignition control switch and a common operating device for said switches, said operating device having a "running" position in which only the ignition switch is closed, and a "starting" position in which both the ignition and starting switches are closed, and an intermediate "stop" position in which neither switch is closed, and means for moving said operating device automatically from the "starting" position past said "stop" position to said "running" position, said means arranged to permit said operating device to remain at the "stop" position when moved thereto from the "running" position, and a spring which engages said operating device when the latter is moved from the "stop" position to the "starting" position, said spring adapted to throw said operating device from the "starting" position past said "stop" position to the "running" position.

3. A combined starter and ignition system for motor vehicles, comprising a starter control switch and an ignition control switch and a common operating device for said switches, said operating device having a "running" position in which only the ignition switch is closed, and a "starting" position in which both the ignition and starting switches are closed, and an intermediate "stop" position in which neither switch is closed, and means for moving said operating device automatically from the "starting" position past said "stop" position to said "running" position, said means arranged to permit said operating device to remain at the "stop" position when moved thereto from the "running" position, and a spring which engages said operating device when the latter is moved from the "stop" position to the "starting" position, said spring adapted to throw said operating device from the "starting" position past said "stop" position to the "running" position, and means for arresting the operating device when the latter reaches said "running" position.

4. A control system for motor vehicles, comprising a hollow steering post, concentric steering, throttle, and switch shafts within same, steering gear operated by the steering shaft, and switch mechanism comprising a gap bracket connecting same to said steering gear, the throttle shaft having an arm working in the gap of said bracket, the switch shaft connected to and arranged to operate said switch mechanism.

5. A combined starter and lighting system for motor vehicles, comprising a starter control switch and a lighting circuit control switch, the latter adapted to control a plurality of lighting circuits singly and in combination, and operating means for said switches comprising a single movable operating member adapted in one position to close the starter switch and in other successive positions to adjust the lighting switch for the closing of various lighting circuits, ratchet mechanism for holding the lighting switch in any position to which it is adjusted, during operation of the starter switch by said operating member, means tending to restore said lighting switch to normal condition, and means for tripping said ratchet mechanism to permit such return of the lighting switch.

6. A combined ignition and lighting system for motor vehicles, comprising an ignition control switch and a lighting circuit control switch, the latter adapted to control a plurality of lighting circuits singly and in combination, and operating means for said switches comprising a single movable operating member adapted when in one position to close the ignition switch and in other successive positions to adjust the lighting switch for the closing of various lighting circuits, ratchet mechanism for holding the lighting switch, in any position to which it is adjusted, during operation of the ignition switch by said operating member, means tending to restore said lighting switch to normal condition, and means for tripping said ratchet mechanism to permit such return of the lighting switch.

In testimony whereof I have signed this specification in the presence of two subscribing witnesses.

WILLIAM H. COLLIER.

Witnesses:
J. T. BERRY,
F. R. CHEATHAM.